(12) United States Patent
Trigilio

(10) Patent No.: US 6,230,416 B1
(45) Date of Patent: May 15, 2001

(54) LASER SQUARE

(76) Inventor: Anthony J. Trigilio, 5033 Joseph St., Maple Heights, OH (US) 44137

( * ) Notice: Subject to any disclaimer, the term of this patent is extended or adjusted under 35 U.S.C. 154(b) by 0 days.

(21) Appl. No.: 09/216,411

(22) Filed: Dec. 18, 1998

Related U.S. Application Data

(60) Provisional application No. 60/069,412, filed on Dec. 18, 1997.

(51) Int. Cl.[7] .............................. B43L 7/027; G01B 7/305
(52) U.S. Cl. ................................ 33/474; 33/451; 33/475; 33/DIG. 21
(58) Field of Search .................................. 33/424, 275 R, 33/286, 404, 405, 416, 418, 420, 423, 427, 429, 451, 474, 480, DIG. 21, 475, 476

(56) References Cited

U.S. PATENT DOCUMENTS

| | | | | |
|---|---|---|---|---|
| 5,531,031 | * | 7/1996 | Green | 33/365 |
| 5,568,265 | * | 10/1996 | Matthews | 356/399 |
| 5,713,135 | * | 2/1998 | Acopulos | 33/451 |
| 5,727,325 | * | 3/1998 | Mussell | 33/429 |
| 5,894,675 | * | 4/1999 | Cericola | 33/451 |
| 5,966,826 | * | 10/1999 | Ho | 33/365 |
| 6,041,510 | * | 3/2000 | Huff | 33/374 |

* cited by examiner

Primary Examiner—Andrew H. Hirshfeld
Assistant Examiner—R. Alexander Smith
(74) Attorney, Agent, or Firm—D. Peter Hochberg; Katherine R. Vieyra; William H. Holt

(57) ABSTRACT

A square holding a laser device for transmitting a laser beam to generate straight lines from the square to the surface upon which the laser beam impinges.

6 Claims, 1 Drawing Sheet

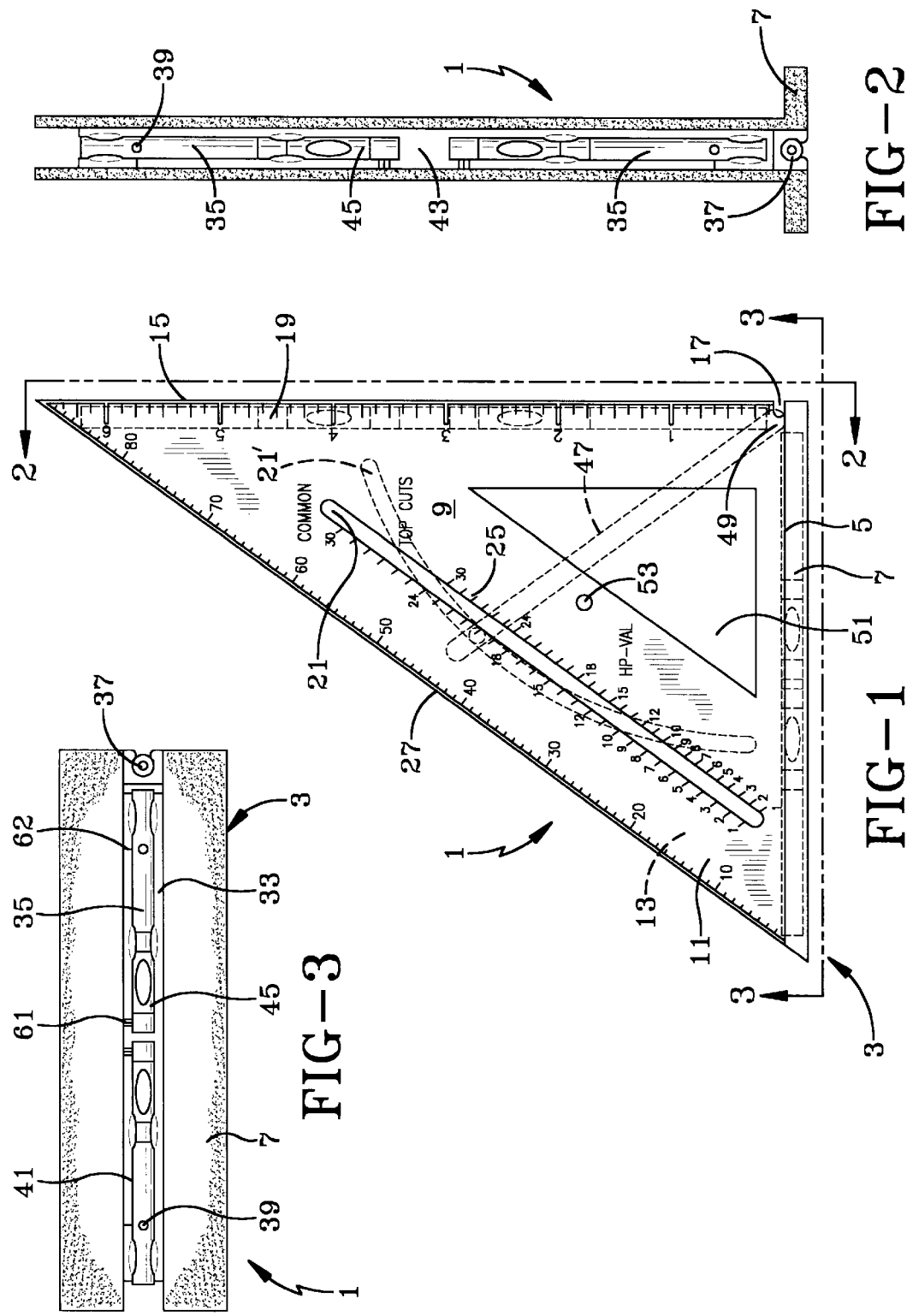

LASER SQUARE

CROSS REFERENCE TO RELATED APPLICATION

This application claims the benefit of prior U.S. provisional application Serial No. 60/069,412 filed Dec. 18, 1997, under Title 35 U.S.C. §119(e).

FIELD OF THE INVENTION

This invention relates to the generation of straight lines by craftsman and the like, and in particular to squares for generating straight lines.

DESCRIPTION OF THE PRIOR ART

Speed squares, sometimes known as framing squares or rafter squares or rafter angle squares, are used for a variety of tasks by carpenters, electricians, plumbers and the like. Speed squares typically have a main body with dimensions of approximately 7¼"×7¼"×10". The 7¼" sides are straight edges and are marked with rulers and lay out lines. The rulers are used to mark out rafter layouts straight line cuts, angle line cuts, etc. Carpenters frequently use speed squares for erecting roofs, in which common rafters, hip rafters, valley or jack rafters, and cornices are cut with the proper plumb, heel and side cuts so that the rafters can be put in place with the proper pitch and length. For example common rafters are cut by first multiplying the rafter rise (in feet) by 12, and dividing by the run (generally the distance from the outside wall or the top plate on which the rafter will rest), to one half the building width (with a deduction of one half the thickness of the ridge board if one is used). This yields the inch rise. One then uses a table to obtain the rafter length. The carpenter then places the "T" bar of the speed square against the edge of the rafter, and pivots the speed square around its pivot or heel (the juncture of the T-bar and the 90° edge) until the inch rise (determined above) reading on the common top cuts scale lines up with the edge of the rafter. A plumb mark is then made on the rafter. The hypotenuse of the speed square is lined up at 90° to the plumb mark, and the T-bar is rested against the edge of the rafter, and a line is made to form the seat notch or birds mouth layout. Similar computations are made for the other rafters on the roof.

Carpenters frequently use strings to line the rafters up from rafter to rafter to make sure the rafters will lie properly. Strings are also used in laying hips on hip jacks, valleys on valley jacks, etc. There is always a problem that the strings will become tangled as the rafters are moved, and extra care (and time expended) in moving the rafters to avoid touching the strings.

Another problem roofing carpenters having involves transferring marks from a ridge board to a valley rafter or a hip rafter. Some carpenters use the combination of a carpenter's steel square (discussed below) and strings, but it is difficult to define a straight line in this situation.

Speed squares also include variations. One has an adjustable angle arm.

Another type of square also used by carpenters constructing roofs is a carpenter's steel square. This type of square has a long and wide blade or body portion which is perpendicular to a tongue portion, and they meet at a 90° outside angle called the heel. It is marked in inches (or millimeters) and is marked with tables (such as rafter tables, an octagon scale, an Essex board measure table and a brace measure table, with the rafter table being the most common) to enable the carpenter to set out staircases or rafters, or given other dimensions, the hypotenuse of a triangle. The carpenter's steel square is used to determine the inch rise or "rise per foot run."

Speed squares and carpenter's squares (and other squares like combination squares and level squares) are used for generating straight lines, and could be even more useful except for the problem of determining straight lines at long distances, up heights such as on roofs or ceilings, across spaces where there are encumbrances (like strings, as noted above) or across areas having depths which cannot be traversed (such as roofs only having the end rafters in place). Another problem is that to generate straight lines often requires two people for holding a tape measure, or setting a string. Plumbers need to generate straight lines for laying pipe, but the spaces in which they work are sometimes dark or narrow, and they have difficulty in using any instrument to generate straight lines.

Similarly, electricians must generate straight lines, as for example in putting wire in place along a straight line. In stringing wire along a wall, electricians sometimes use a chalk line or chalk box for snapping a marked line. It is used for marking a straight line on a surface. The chalk line is covered with chalk dust by a gasket as the line is pulled from its case. A hook and ring at one end are attached to a nail or between boards, and it is snapped at its center to transfer the chalk to the wall, along which the electrician can put the wire in place. Chalk lines have many other uses, such as for hanging wallpaper vertically or for putting a center line on a ceiling for the application of tiles, and the square according to the invention may be useful in those situations.

Another instance where straight lines are needed is for marking the walls at a certain height from a datum, such as a ceiling. It is laborious to go around the room measuring from the corner of the wall and ceiling the required amount of distance and marking the wall as each measurement is made.

SUMMARY OF THE INVENTION

An object of the invention is to provide an improved tool for easily generating straight lines across spaces without the requirement of using physical objects at the distant end of the line.

Another object is to provide an improved square for generating straight lines over both short distances to long distances, especially in buildings, walls, roofs and the like.

It is yet a further object to provide an improved speed square for generating straight lines for increasing the types of tasks with which a speed square can be used.

Still an additional object is to provide an improved square for generating straight lines in an economical, efficient and inexpensive manner.

These objects are achieved according to the preferred embodiment of the invention by the provision of a speed square as discussed earlier. The square is provided with a laser beam emitter such as a laser diode, batteries to power the diode, and a container for holding the diode and batteries. The body of the square or the part of the square which holds the container, is made thick enough to hold the container, this being about 1 inch thick. The container would be in the T-bar straight edge and/or the ruler edge, which is perpendicular to the T-bar edge and along the length of the arm. There would be at least one laser container, and the square could have 4 laser containers with one pointing in each direction in each of the two 90° arms, i.e. the T-bar edge and the ruler edge. The speed square would be provided with water or bubble levels parallel to each of the 90° arms, for leveling the square or to plumb an object.

BRIEF DESCRIPTION OF THE DRAWINGS

FIG. 1 is a side view of a speed square according to the invention with a modification shown in the central part in dotted lines.

FIG. 2 is an end view taken in the direction of the arrows 2—2 in FIG. 1.

FIG. 3 is a view taken in the direction of arrows 3—3 in FIG. 1.

DESCRIPTION OF THE PREFERRED EMBODIMENT

Turning now to the drawings, FIGS. 1–3 show a speed square 1 according to the preferred embodiment of the invention. Speed square 1 includes a T-bar portion 3 having a straight T-bar edge 5 and a T-bar 7. Speed square 1 has a body 9 with a pair of opposite faces 11 and 13. A ruler edge 15 is perpendicular to T-bar straight edge 5, and T-bar 7 is perpendicular to body 9. T-bar straight edge 5 and second straight edge 15 are of equal length, although in other types of squares these lengths may differ. T-bar straight edge 5 and ruler edge 15 meet at right angles at a pivot or heel 17.

An inch scale 19 is provided adjacent ruler edge 15. A slot 21 is provided in body 9. A scale for the common top cuts 23 and a scale for the hip-val top cuts 25 are provided on both sides of slot 21. A hypotenuse edge 27 interconnects the free ends of T-bar straight edge 5 and second straight edge 15, and they meet at 45° angles.

The foregoing description of speed square 1 are all known in the art, and reference is made to the instruction manuals for such speed squares as are manufactured by Johnson Level & Tool Manufacturing Co., Inc. and Swanson. Other instruction manuals and books are easily available.

A notch or groove 33 is provided in T-bar 7 ring parallel to T-bar straight edge 5. This notch or groove 33 is dimensioned to hold one or two laser packs 35. Each laser pack 35 includes a laser diode 37 and a battery or batteries for powering diode 37. Each laser pack 37 is preferably purchased as a unit in a container 41, and container 41 snaps into groove 33. Each laser pack 35 includes an on-off switch 39 for activating to turning on laser pack 35, or for deactivating or turning off laser pack 35.

The laser units have laser beam lights which are referred to as diodes. A preferred laser beam light is the Visible Red Laser Diode, which generates a red laser beam along a straight line, and has a range of about 300 feet and a ¼ inch accuracy. These diodes usually are powered by 1 to 5 batteries, of the watch-type, AA, AAA, AAAA or similar types. Rechargeable batteries could also be used.

A similar arrangement can be provided along ruler edge 15. A groove 43 can be provided for holding laser packs 35 which are identical to the same laser packs held in groove 33. The parts of laser packs 35 in groove 43 are the same as those in groove 33, and bear the same numbers. The portion of speed square 1 having groove 43 extends up to T-bar 7, so that laser diode 37 in groove 43 which is adjacent to pivot 17 is not impeded by parts of speed square 1 which are associated with T-bar 7.

Speed square 1 is thus provided with four laser packs 35, although the invention covers the speed square having only one laser pack.

A set of levels are provided in square 1 to enable speed square to be held in a level position which is parallel to the ground, and thus perpendicular to the ground. In the preferred embodiment water or bubble levels 45 are provided in grooves 33 and 41, respectively adjacent laser packs 35. A window or other clear area is provided to see the level. Levels 45 could also be appropriate electronics. Square 1 can be held against a wall, floor or other support surface for leveling square 1 so that its laser beam can generate a straight line, and wall as to indicate if the support surface is not level. Mounting means (60) is provided to attach bubble levels (45) and laser packs (35) in grooves (33) and (43), respectively. Mounting means 60 includes an adjustment screw (61) and tensioning spring (62).

In order to use the laser portion of speed square 1, one need only to position the speed square in place so that the point to which the laser beam is to impinge upon is not obstructed by some item. Then, switch 39 is turned on, and laser diode 37 generates a laser beam to provide a laser dot at the place to which it is aimed. One can simply mark the point of impingement of the laser beam to determine where a straight line would extend to from the location of the laser diode to the place of impingement. No strings are needed, and indeed, no physical objects are required in order to locate where a straight line would go. This invention can make heretofore difficult jobs very simple. For example, when a carpenter wants to determine how to line up rafters from rafter to rafter, he now need only position speed square 1 in place, probably using T-bar 7, and turn laser diode 37 to point in the direction in which the rafter is to be placed. The laser beam impinges on the spot on the opposite rafter in which the rafter to be placed shall extend. There is no need for using strings in order to obtain the proper direction.

A modification to speed square I is an adjustable square which is similar to a speed square, but it has an adjustable angle arm 47 shown in dotted lines, which is pivotably mounted on the square by an axle or pivot pin 49. The T-bar can be dispensed with. One of the perpendicular edges of the adjustable square is laid against a support surface, and arm 47 is adjusted to determine the angle of another surface. Groove 21 is now in the form of a portion of a curve, shown as groove 21' so that adjustable arm 47 can pivot about pivot pin 49. The scales corresponding to scales 23 and 25 would also be provided. The laser apparatus and levels, and the means for holding these items in place, are all substantially the same as for the speed square.

A cut-out 51 can be provided for reducing the weight of the square. Appropriate scales could be provided of the cut-out has other purposes.

Square 1 must be constructed to securely hold the laser packs and batteries. Body 9 would typically be about 1" thick so that the grooves for holding the laser packs and batteries securely, and for enabling the square to perform its function in the work environment.

In the same manner, a carpenter will be able to use laser packs according to the invention in determining where to place hip and valley rafters on roofs. Likewise, transferring marks from a ridge board to a valley rafter or to a hip rafter, rather than using the complicated procedure of a combination of a carpenter's steel square and strings, can now be done by simply holding speed square 1 in place and tuning on the appropriate laser pack to determine where the mark from a ridge board to a valley rafter or hip rafter should be placed.

In order to determine where a straight line should go across a space, such as across a space between two end rafters, it is now necessary only to position speed square 1 on one of the end rafters, and turn the appropriate laser diode 37 on and observe where the laser beam impinges.

A very important advantage of the present invention is that it facilitates the alignment of rafters and other beams in a building, alignment being extremely important to properly construct the building. For example, framing members can easily be aligned so that duct work and the like can extend in the building without being impeded by improperly placed joists (or improperly placed framing members). A square according to the invention need only be laid against a wall or other member and adjusted so that it is level. The laser beam then indicates the straight line from the level, to assure the frame members can be properly located.

The invention is also very helpful as a leveling device. The square is not level as indicated by the bubble level or other level means, the laser device can be activated to transmit the beam to a distant object. The impingement of the beam or the object can be measured or observed to determine how far the place on which the square is laid is tilted, and how much the square must be moved to make it level.

An electrician can determine where to lay a wire along a straight line in a wall, without having to snap a chalk string. He would simply position speed square 1 in place at the end of the wall, turn on the appropriate laser diode 37, and use a pencil at different points along the wall by putting the pencil in front of the laser beam. By doing this at appropriate distances along the wall, a straight line can be easily generated with only one person, and without requiring a chalk line.

Plumbers will now be able to determine where to lay pipes, even in narrow holes in a building or the ground. Speed square 1 need only be positioned at the beginning of the straight line required, and laser pack 35 is used to determine where the laser beam impinges, thus showing the straight line from speed square 1 and the place where the laser beam impinges.

In order to determine a particular distance from a floor or other base to a position above the floor or base, it is only necessary to mount speed square 1 on a tripod or rotating tripods, such through a mounting aperture 53, which connects to the tripod with a screw or other connectors. The square could be rotated on a string about aperture 53. A laser beam goes from speed square 1 to the wall at which the dimension is to be made, and appropriate marks are made where the laser beam impinges the wall. This can be done quickly and without difficulty yielding very accurate results.

The present invention has many other uses other than those described above. Moreover, it can be used with many other squares mentioned earlier. Laser packs are sold on the market and speed squares and other squares can readily be modified to incorporate receptacles on the squares for holding the laser packs.

The preferred embodiment of the invention described using notches or grooves for holding the laser packs. There are other means which could be used as well. The squares could have opposing, separable squares, so that that laser pack could be held in place in the form of a sandwich. Other attachment devices could be used. If the square were made using some sort of mold, an appropriate receptacle for the laser diode and battery could be supplied. In other instances, a battery might not be necessary and solar energy could be incorporated to power the laser diode.

A square according to the invention can be used for a variety of tasks. It can be used to square, to square off an object, level, plumb and align, survey, etc.

The invention has been described above with particular emphasis on the preferred embodiment, but variations and modifications within the spirit and scope of the invention may appear to those skilled in the art to whom the invention pertains.

What is claimed is:

1. An integral square comprising:

a lightweight, triangular frame having a triangular planform comprising:

a smooth first triangular shaped face and a smooth second triangular shaped face opposite from each other a pre-determined distance, said faces and said pre-determined distance defining a first side and a second side;

a first edge extending along said first side;

a second edge extending along said second side and being perpendicular to said first edge;

a third edge extending between distal ends of said first edge and said second edge;

a T-bar attached to said first edge of said frame and extending the length of said first edge for supporting said square against a flat surface for drawing angles based upon said T-bar as a datum;

a first groove formed in said T-bar and extending parallel to said first edge;

a second groove formed in said second edge;

a first laser device and a second laser device mounted in said first groove pointing along the length of said first groove in opposing directions to each other for generating laser beams for generating a straight line which terminates at surfaces upon which said laser beams terminate;

a third laser device and a fourth laser device mounted in said second groove and pointing along the length of said second groove in opposing directions to each other for generating laser beams for generating a straight line which terminates at the surfaces upon which said laser beams terminate;

level means mounted adjacent to said first laser device and said second laser device for indicating when said first edge of said square is level with the ground, and level means adjacent to said third laser device and said fourth laser device means for indicating when said second edge of said square is level with the ground; and mounting means for mounting said first laser device, said second laser device, and the level means adjacent to said first laser device and said second laser device in said first groove and for mounting said third laser device, said fourth laser device, and said level means adjacent to said third laser device and said fourth laser device in said second groove.

2. The square of claim 1 wherein said mounting means includes an adjusting screw and a tensioning spring.

3. The square according to claim 2 wherein said first laser device, said second laser device, said third laser device, and said fourth laser device each further comprises a laser beam emitting diode, battery means for supplying electric power to said diode and a container for holding said diode and said battery means.

4. The square according to claim 3 wherein said first laser device, said second laser device, said third laser device, and said fourth laser device each further include switch means for electrically connecting and disconnecting said battery means and said diode.

5. The square of claim 4 wherein said level means is comprised of a bubble level.

6. The square of claim 4 wherein said level means is comprised of an electronic level.

* * * * *

UNITED STATES PATENT AND TRADEMARK OFFICE
CERTIFICATE OF CORRECTION

PATENT NO.    : 6,230,416 B1
DATED         : May 15, 2001
INVENTOR(S)   : Trigilio et al.

It is certified that error appears in the above-identified patent and that said Letters Patent is hereby corrected as shown below:

<u>Columns 1-5,</u>
In each occurrence, "Speed squares" has been changed to -- Triangular-shaped measuring squares -- and "speed squares" has been changed to -- triangular-shaped measuring squares --. In addition, in each occurrence, "Speed square" has been changed to -- Triangular-shaped measuring square -- and "speed square" has been changed to -- triangular-shaped measuring square --.

Signed and Sealed this

Twenty-sixth Day of August, 2003

JAMES E. ROGAN
*Director of the United States Patent and Trademark Office*